US010694252B1

(12) United States Patent
Nash et al.

(10) Patent No.: US 10,694,252 B1
(45) Date of Patent: Jun. 23, 2020

(54) SERVICE-BASED PREVENTION OF STREAM SNIPING

(71) Applicant: Amazon Technologies, Inc., Seattle, WA (US)

(72) Inventors: Brent Ryan Nash, Ladera Ranch, CA (US); Yasser Rihan, Irvine, CA (US); Kevin Jeremy Loose, Irvine, CA (US); Pablo Puo Hen Cheng, Pomona, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/907,053

(22) Filed: Feb. 27, 2018

(51) Int. Cl.
H04N 21/454 (2011.01)
H04N 21/435 (2011.01)
A63F 13/30 (2014.01)
A63F 13/795 (2014.01)
H04N 21/2187 (2011.01)

(52) U.S. Cl.
CPC ......... H04N 21/4542 (2013.01); A63F 13/30 (2014.09); A63F 13/795 (2014.09); H04N 21/435 (2013.01); H04N 21/2187 (2013.01)

(58) Field of Classification Search
None
See application file for complete search history.

(56) References Cited

U.S. PATENT DOCUMENTS

| 6,999,083 B2* | 2/2006 | Wong | A63F 13/12 345/473 |
| 7,169,050 B1* | 1/2007 | Tyler | A63F 13/12 463/1 |
| 8,647,206 B1* | 2/2014 | Gottlieb | A63F 13/12 463/40 |
| 9,108,107 B2* | 8/2015 | Perlman | A63F 13/355 |
| 9,339,728 B2* | 5/2016 | Sullivan | A63F 13/424 |
| 10,092,833 B2* | 10/2018 | George | A63F 13/35 |
| 2003/0220143 A1* | 11/2003 | Shteyn | A63F 13/12 463/42 |
| 2004/0255032 A1* | 12/2004 | Danieli | A63F 13/12 709/229 |
| 2006/0058103 A1* | 3/2006 | Danieli | A63F 13/12 463/42 |

(Continued)

OTHER PUBLICATIONS

U.S. Appl. No. 15/906,992, filed Feb. 27, 2018, Nash et al.

*Primary Examiner* — Alexander Q Huerta
(74) *Attorney, Agent, or Firm* — BakerHostetler

(57) ABSTRACT

Techniques for stream sniping prevention are disclosed herein. A video game player may provide captured video of the video game for transmission to viewers. In some examples, an obfuscation component may detect, within the captured video, private game information regarding the player, for example using one or more non-visual detection techniques. The private game information may then be obfuscated in the video that is provided to the viewers, while still allowing the private game information to be displayed to the player. Also, in some examples, a user may issue a request associated with a video game, such as a request to join a video game, game server, and/or match. It may then be determined whether the user is currently receiving video of the video game from the player. If so, then the user may be blocked from joining the same video game, game server, and/or match as the player.

12 Claims, 11 Drawing Sheets

(56) References Cited

U.S. PATENT DOCUMENTS

| | | | |
|---|---|---|---|
| 2007/0117617 A1* | 5/2007 | Spanton | A63F 13/86 463/29 |
| 2007/0117635 A1* | 5/2007 | Spanton | A63F 13/12 463/43 |
| 2009/0163280 A1* | 6/2009 | Feng | A63F 13/12 463/42 |
| 2009/0259765 A1* | 10/2009 | Karlsson | H04L 65/4092 709/231 |
| 2010/0035691 A1* | 2/2010 | Wild | H04L 67/24 463/42 |
| 2013/0288799 A1* | 10/2013 | Harris | A63F 13/86 463/42 |
| 2014/0018165 A1* | 1/2014 | Kern | A63F 13/355 463/31 |
| 2015/0119142 A1 | 4/2015 | Abbott et al. | |
| 2015/0165320 A1* | 6/2015 | Perlman | A63F 13/335 463/31 |
| 2015/0202529 A1* | 7/2015 | Paradise | A63F 13/12 463/31 |
| 2016/0250553 A1* | 9/2016 | Ikenaga | A63F 13/86 463/31 |
| 2017/0001111 A1* | 1/2017 | Willette | A63F 13/85 |
| 2017/0003740 A1* | 1/2017 | Verfaillie | G06F 3/013 |
| 2017/0011554 A1* | 1/2017 | Burba | A63F 13/5255 |
| 2017/0171629 A1 | 6/2017 | Soh et al. | |
| 2017/0246544 A1* | 8/2017 | Agarwal | A63F 13/86 |
| 2017/0289623 A1 | 10/2017 | Bailey et al. | |
| 2019/0108608 A1 | 4/2019 | Ito | |

* cited by examiner

SERVICE-BASED PREVENTION OF STREAM SNIPING

BACKGROUND

The popularity of video game streaming has increased rapidly in recent years. In some examples, video game players may capture video of their games and live stream the captured video to a number of viewers. In many cases, players may provide the captured video to a video streaming service, which may, in turn, broadcast the captured video to large numbers of viewers. A player that provides captured video to viewers may often be referred to as a streamer. With the rise of live streaming of video games, a new form of cheating and harassment, known as stream sniping, has become more common. Stream sniping may occur in instances when a streamer's live stream is being viewed by another competing player that is playing the same game as the streamer. The idea of stream sniping is that the competing player may watch and use the stream to obtain private game information about the streamer. The private game information may include information that the competing player would not otherwise normally have about the streamer (e.g., information that would not be provided by the game to the competing player). The private game information may include, for example, what server the streamer is playing on, how much health the streamer has, where the streamer is in the game world, an indication of the streamer's inventory, and the like. The competing player may then use the private game information to harass or cheat against the streamer.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

Figure 1:
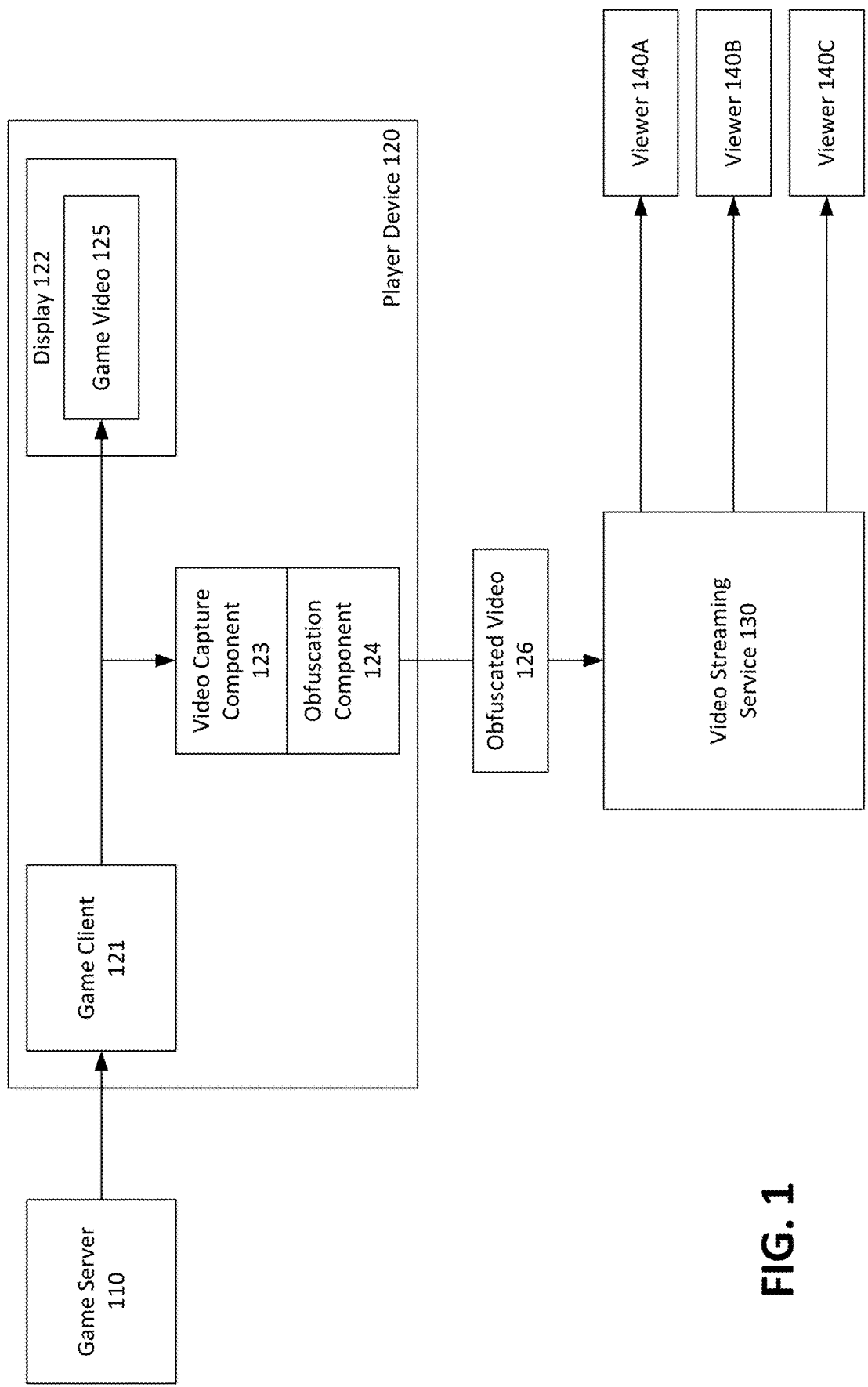
FIG. 1 is a diagram illustrating a first example client-based stream sniping prevention system that may be used in accordance with the present disclosure.

Various techniques for prevention and/or deterrence of stream sniping are described herein. In particular, in some examples, a video game player, referred to as a streamer, may capture video from a game and provide the captured video for streaming to a number of viewers. In some examples, the streamer may provide the captured video to a video streaming service, which may, in turn, broadcast the captured video to large numbers of viewers. Also, in some examples, the video may be streamed to the viewers using live streaming techniques, in which the video is transmitted and presented to the viewers while the video game is being played by the streamer, with only a small amount of latency between the time that the video is captured from the streamer and the time that the video is presented to the viewers. In some examples, the streamer may operate a video capture component, such as screen capture software, that captures video from the streamer's device, such as video of the game being played by the streamer, for transmission to the viewers.

In some examples, an obfuscation component may execute, for example in combination with the screen capture component, to detect areas of the captured video that include private game information about the streamer. The private game information may include information about the streamer that the video game provides to the streamer but does not provide to one or more other players, such as one or more competing players. The private game information may include, for example, an indication of a server that the streamer is playing on, an indication of how much health the streamer has, an indication of the streamer's virtual location in the game world, an indication of the streamer's inventory, and the like.

Upon detection of the private game information, the obfuscation component may obfuscate areas of the captured video that include the private game information, for example by overlaying or replacing the private game information with other image or graphical content, by blurring or obscuring the private game information, or using any other suitable techniques. In one specific example, the private game information may be replaced or overlaid by advertising or promotional content. By obfuscating the private game information in the captured video, the obfuscation component may prevent viewers of the captured video from seeing or otherwise obtaining the private game information. Thus, viewers of the captured video will not be able to use the private game information in the video game to the detriment of the streamer, thereby preventing stream sniping.

In contrast to the captured and obfuscated video that is provided to the viewers, the video that is displayed locally to the streamer may not be obfuscated and may instead display the private game information to the streamer, thereby allowing the streamer to view and use the private game information while still obfuscating the private game information from the other viewers. It is noted that some conventional video games may allow games to be played in a streamer mode in which the game may not display certain private game information. However, while this conventional type of streamer mode may be effective at preventing private game information from being visible to stream viewers, it may also be problematic because it may hide the private game information from the streamer, thereby hindering the streamer's ability to view and use the private game information. By contrast, by obfuscating private game information at the stream-level as opposed to the game-level, the obfuscation component described herein may allow the streamer to view and use the private game information while still obfuscating the private game information from the other viewers.

The obfuscation component may employ various techniques to detect private game information within the captured video content. In some examples, the obfuscation component may execute one or more computer-based image recognition processes on the captured video, such as to identify features of the captured video that may be likely to include private game information. For example, in some cases, areas of the captured video that include text may be considered as likely to include private game information, and the obfuscation component may perform an image recognition process to identify text within the captured video. Additionally, in some examples, image recognition may be employed to identify a type of screen that is currently being displayed in the video (e.g., title screen, matchmaking screen, in-match screen, menu screen, cinematic sequence, etc.), and private game information may then be detected based on the type of screen that is currently being displayed. For example, private game information may often not be displayed on the title screen, while private game information may often be displayed in certain areas of an in-match screen.

Also, in some examples, the obfuscation component may communicate with the video game itself, such as with video game server and/or video game client components, or via one or more intermediate services, to receive metadata or other information about the game being played. In some cases, this information may be updated in real-time and/or periodically throughout gameplay, such as to provide the obfuscation component with current information about the video being captured. For example, in some cases, the video game may indicate to the obfuscation component a type of screen that is currently being displayed in the video. Also, in some examples, the video game may provide metadata to the obfuscation component about events that occur within the game, such as starting or ending of a match, display of a map, movement to certain locations, acquisition of resources, display of inventories, and other game events, and private game information may then be detected based on occurrence of these events. In yet other examples, the video game may provide metadata that directly identifies locations of the private game information within the captured video, such as image coordinate information and the like.

In some examples, the obfuscation component may be a plug-in component that serves as a plug-in to the video capture component. Additionally, in some examples, the obfuscation component may be specific to one or more respective game titles and may include instructions for obfuscating features of the respective game titles. For example, in some cases, the obfuscation component may be programmed by developers of the respective game titles or others with advanced knowledge of the respective game titles, such as knowledge about when and where private game information may be displayed by the game. In some cases, several obfuscation plug-ins or other obfuscation components may be available to the streamer, and the streamer may select an appropriate obfuscation component that matches a respective video game being played by the streamer. In yet other examples, a video capture or other computing component may be configured to determine a game that is being played by a streamer and automatically download and/or install an appropriate obfuscation component that matches a respective video game being played by the streamer.

In some pre-existing techniques, a streamer/player may manually detect and locate private game information within game video. For example, the streamer/player may manually detect and locate the private game information using visual detection techniques by visually observing the location of the private game information with the human eye. Additionally, in some pre-existing techniques, the streamer/player may manually obstruct the private game information. For example, the streamer/player may configure and/or position an overlay at the location of the private game information within the captured video. The overlay may then be inserted into the outgoing stream to block the view of the private game information by viewers of the stream. However, these pre-existing techniques may be problematic because they may require the streamer/player to manually detect and locate the private game information within the video, and to manually obstruct the private game information, for example by positioning an overlay at the location of the private game information.

In contrast to the above described pre-existing techniques, the obfuscation component may, for example, be configured to detect and/or obfuscate private game information without requiring the streamer to visually detect and manually indicate the location of the private game information. For example, the obfuscation component may detect the private game information using non-visual detection techniques, such as the computer-based image recognition techniques and video game metadata techniques described above. Non-visual detection techniques, as used herein, refers to techniques that do not require use of the human eye to detect and/or locate private game information. Moreover, the obfuscation component may be configured to obfuscate private game information on behalf of the streamer without requiring the streamer to manually generate an overlay or otherwise manually obfuscate the private game information. As the locations and display of private game information may often vary between different games and/or between different events in the same game, this may save considerable time and effort on behalf of the streamer. Although the obfuscation component may not require the streamer to manually identify or obfuscate the private game information, the obfuscation component may nevertheless allow the streamer to set certain options, such as options to designate various types of information (e.g., location information, health information, server information, inventory information, etc.) as information to be obfuscated or not obfuscated, certain time ranges at which to obfuscate or not obfuscate information, and the like.

In addition or as an alternative to the techniques described above, various other measures may be employed to prevent stream sniping, for example by blocking viewers of a streamer's video from performing certain game-related actions, such as joining (i.e., becoming a player of) the same video game that is displayed in the streamer's video. For example, when a user attempts to join a particular video game, the user may provide identification information (e.g., username, password, etc.) that identifies the user to the game and/or to a service that manages the game. The game/service may then execute a query to determine whether the same user is currently receiving a stream of that video game from a game player. If the user is currently receiving a stream of that video game, then the user's request to join the video game may be denied (e.g., by way of an error message, transparently disallowing the user from joining the game, etc.), for example permanently or at least until the user ceases to receive the identified stream. In some examples, the game/service may determine that the user is receiving a stream of the game by matching or linking the identification information provided by the user to identification information of current stream viewers for the video game. In other examples, the game/service may employ secondary user-identifying information, such as by matching an Internet Protocol (IP) address, Media Access Control (MAC) address, or other computing address of the user with computing addresses of current stream viewers for the video game. By blocking viewers of a streamer's video from joining a game, those viewers may be prevented from obtaining and using the streamer's private game information against the streamer. In addition or as an alternative to joining a game, stream viewers may also be prohibited from performing other game actions, such as joining the same server as the streamer, moving to the same location as (or within a particular distance of) the streamer, participating in a match against the streamer, joining a team that competes with the streamer, assuming control of a character that competes with the streamer, acquiring certain resources, and the like. In some examples, use of certain identification information, such as a username and/or IP address, may allow detection of a user that is viewing a stream of a game on a first device and simultaneously attempting to join the same game as a player on a second device, thereby providing multiple layers of protection against malicious users that sign in on multiple devices.

In yet other examples, historical information about stream viewers and/or game players may also be collected, stored, and used to prevent stream sniping. For example, historical information may be leveraged to determine whether a user is attempting to join a game with a streamer that the user has watched frequently in the past. If so, then the user may be prohibited from joining. Historical information may also be used to determine other types of information indicative of stream sniping, such as whether a user has a history of getting kills against streamer players in a particular game. Other metadata, such as how many viewers a streamer has, may also be used to determine whether viewers of a stream should be allowed to join a game or perform other game actions. Additionally, retrospective actions may be taken, such as by detecting stream sniping behavior after the fact (e.g. running a weekly set of reports) and discouraging future stream sniping behavior via mechanisms such as banning players, sending warnings, having a three-strike policy, etc.

FIG. 1 is a diagram illustrating a first example client-based stream sniping prevention system that may be used in accordance with the present disclosure. As shown in FIG. 1, a game server 110 may operate in combination with a game client 121 on a player device 120 to execute a video game. In some examples, such as for certain multi-player games, any number of other game clients, executing on any number of other player devices, may also operate in combination with game server 110 and game client 121 to execute the video game. In the example of FIG. 1, game client 121 and player device 120 may be operated by a streamer that plays the video game executed by game server 110 and game client 121 and that provides video from that video game for viewing by a number of viewers 140A-C. The video may be transmitted from the player device 120 to the viewers 140A-C via video streaming service 130. The video may be transmitted to the viewers 140A-C using streaming transmission and playback techniques, for example in which portions of video may be receiving and played while subsequent portions of the video are still being transmitted. In some examples, the video may be streamed using live streaming techniques, in which the video is transmitted and presented to the viewers 140A-C while the video game is being played by the streamer, with only a small amount of latency between the time that the video is captured from the streamer and the time that the video is presented to the viewers 140A-C. The video may be transmitted from the player device 120 to the video streaming service 130 and, in turn, from the video streaming service 130 to the viewers 140A-C using one or more communication networks, for example one or more local area networks (LANs) and/or one or more wide area networks (WANs) such as the Internet.

As shown in FIG. 1, game client 121 may, with the assistance of various rendering components (e.g., a graphics processing unit (GPU), etc.), generate game video 125 of the video game. The game video 125 may be displayed to the streamer via display 122 of player device 120. In some examples, the game video 125 may include graphical depictions of video game scenes, such as including virtual characters and/or virtual objects controlled by the streamer within a virtual game world. As set forth above, in some examples, the game video 125 may also include private game information regarding the streamer. In particular, the private game information may include information about the streamer that the video game provides to the streamer but does not provide to one or more other players, such as one or more competing players. The private game information may include, for example, an indication of a server that the streamer is playing on, an indication of how much health the streamer has, an indication of the streamer's virtual location in the game world, an indication of the streamer's inventory, and the like. In some examples, private game information may be displayed using text, graphics, or combinations thereof, for example that may positioned in areas along an edge or corner of the game video 125. In one specific example, private game information, such as the streamer's current location, may be displayed in a map of the virtual game world that is displayed within the game video 125.

In addition to being displayed to the streamer, the game video 125 may also be captured by video capture component 123, such as screen capture software, for transmission to viewers 140A-C via video streaming service 130. In the example of FIG. 1, prior to being transmitted to the video streaming service 130, obfuscation component 124 may transform the game video 125 into obfuscated video 126, for example by detecting and obfuscating the streamer's private game information within the game video 125. In particular, the obfuscation component 124 may obfuscate the private game information, for example by overlaying or replacing the private game information with other image or graphical content, by blurring or obscuring the private game information, or using any other suitable techniques. In one specific example, the private game information may be replaced or overlaid by advertising or promotional content. By obfuscating the private game information in the obfuscated video 126, the obfuscation component 124 may prevent viewers of the obfuscated video 126 from seeing or otherwise obtaining the private game information. Thus, viewers of the obfuscated video 126 will not be able to join the video game and use the private game information in the video game to the detriment of the streamer, thereby preventing stream sniping. In contrast to the obfuscated video 126 that is provided to the viewers 140A-C, the game video 125 that is displayed locally to the streamer may display the private game information to the streamer, thereby allowing the streamer to view and use the private game information. While FIG. 1 depicts an example in which obfuscated video 126 is streamed from player device 120 to viewers 140A-C indirectly via an intermediate video streaming service 130, there is no requirement that an intermediate video streaming service 130 (or any other intermediate components) must be used. For example, the techniques described herein may also be in cases in which video is streamed directly from player device 120 to viewers 140A-C.

The obfuscation component 124 may, for example, be a plug-in component that serves as a plug-in to the video capture component 123. Additionally, in some examples, the obfuscation component 124 may be specific to one or more respective game titles and may include instructions for obfuscating features of the respective game titles. For example, in some cases, the obfuscation component 124 may be programmed by developers of the respective game titles or others with advanced knowledge of the respective game titles, such as knowledge about when and where private game information may be displayed by the game. In some cases, several obfuscation plug-ins or other obfuscation components may be available to the streamer, and the streamer may select an appropriate obfuscation component 124 that matches a respective video game being played by the streamer. In yet other examples, video capture component 123 or another computing component may be configured to determine a game that is being played by a streamer and automatically download and/or install an appropriate obfuscation component 124 that matches a respective video game being played by the streamer. For example, in some cases, image recognition may be performed on text shown in a title screen of a video game to determine the title, version, etc. of a video game that is being played.

Figure 2:
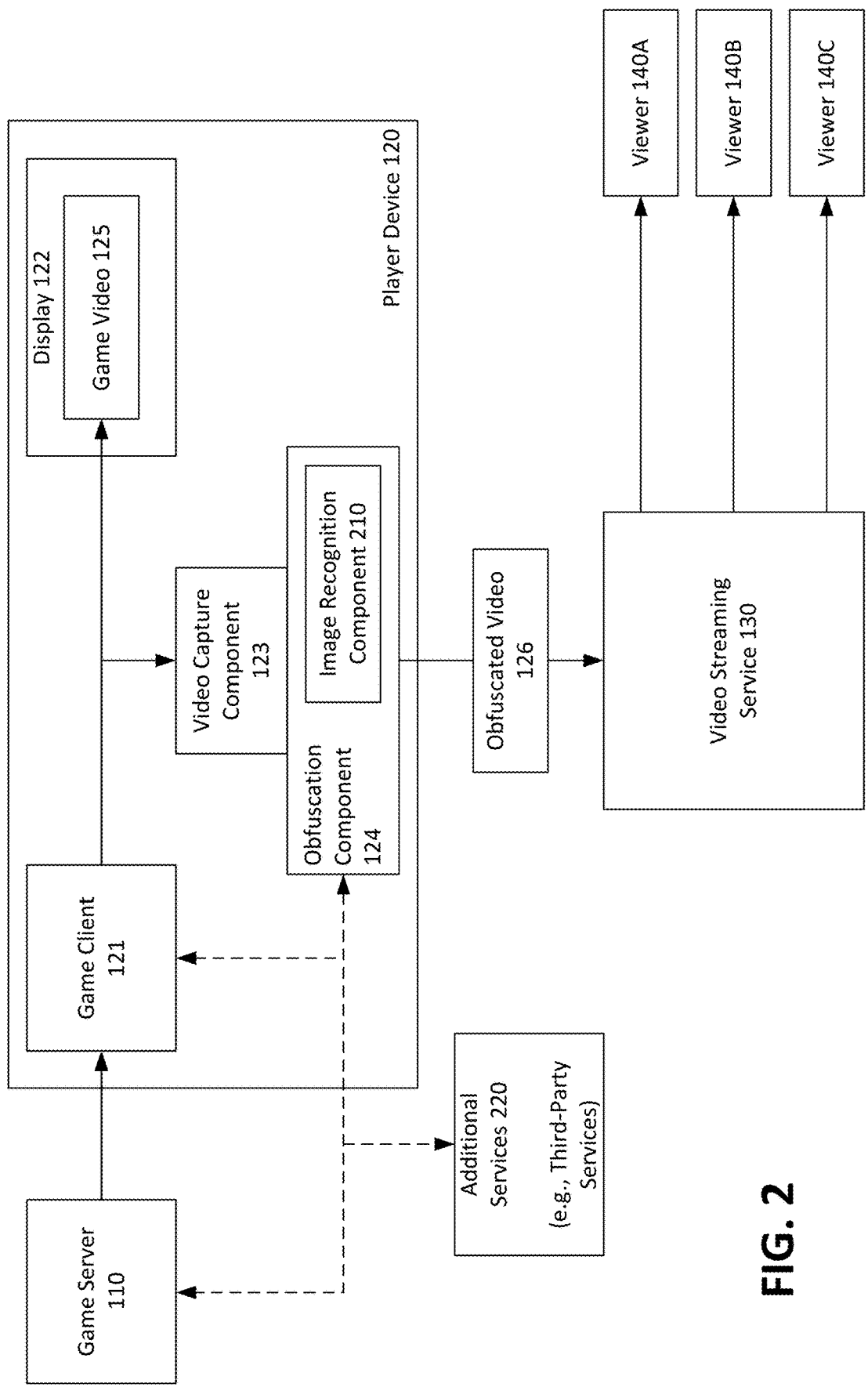
FIG. 2 is a diagram illustrating a second example client-based stream sniping prevention system that may be used in accordance with the present disclosure.

Referring now to FIG. 2, some example techniques for detection of private game information within the game video 125 will now be described in detail. In particular, in some examples, the obfuscation component 124 may include an image recognition component 210, which may execute one or more computer-based image recognition processes on the game video 125, such as to identify features of the game video 125 that may be likely to include private game information. For example, in some cases, areas of the game video 125 that include text may be considered as likely to include private game information, and the obfuscation component 124 may perform an image recognition process to identify text within the captured video. Additionally, in some examples, image recognition may be employed to identify a type of screen that is currently being displayed in the video (e.g., title screen, matchmaking screen, in-match screen, menu screen, cinematic sequence, etc.), and private game information may then be detected based on the type of screen that is currently being displayed. For example, private game information may often not be displayed on the title screen, while private game information may often be displayed in certain areas of an in-match screen.

As also shown in FIG. 2, the obfuscation component 124 may optionally communicate with the video game itself, such as with game server 110 and/or game client 121 (e.g., via the dashed lines shown in FIG. 2) to receive metadata or other information about the game being played. The obfuscation component may also interact with additional services 220, such as third-party services, for example that may operate as intermediaries to collect and provide game metadata to the obfuscation component 124 and/or that may provide additional information relating to the game. In some cases, this information may be updated in real-time and/or periodically throughout gameplay, such as to provide the obfuscation component 124 with current information about the game video 125. For example, in some cases, the video game may provide metadata to indicate to the obfuscation component 124 a type of screen that is currently being displayed in the game video 125. Also, in some examples, the video game may provide metadata to the obfuscation component about events that occur within the game, such as starting or ending of a match, display of a map, movement to certain locations, acquisition of resources, display of inventories, and other game events, and private game information may then be detected based on occurrence of these events. In yet other examples, the video game may provide metadata that directly identifies locations of the private game information within the captured video, such as image coordinate information and the like.

Figure 3:
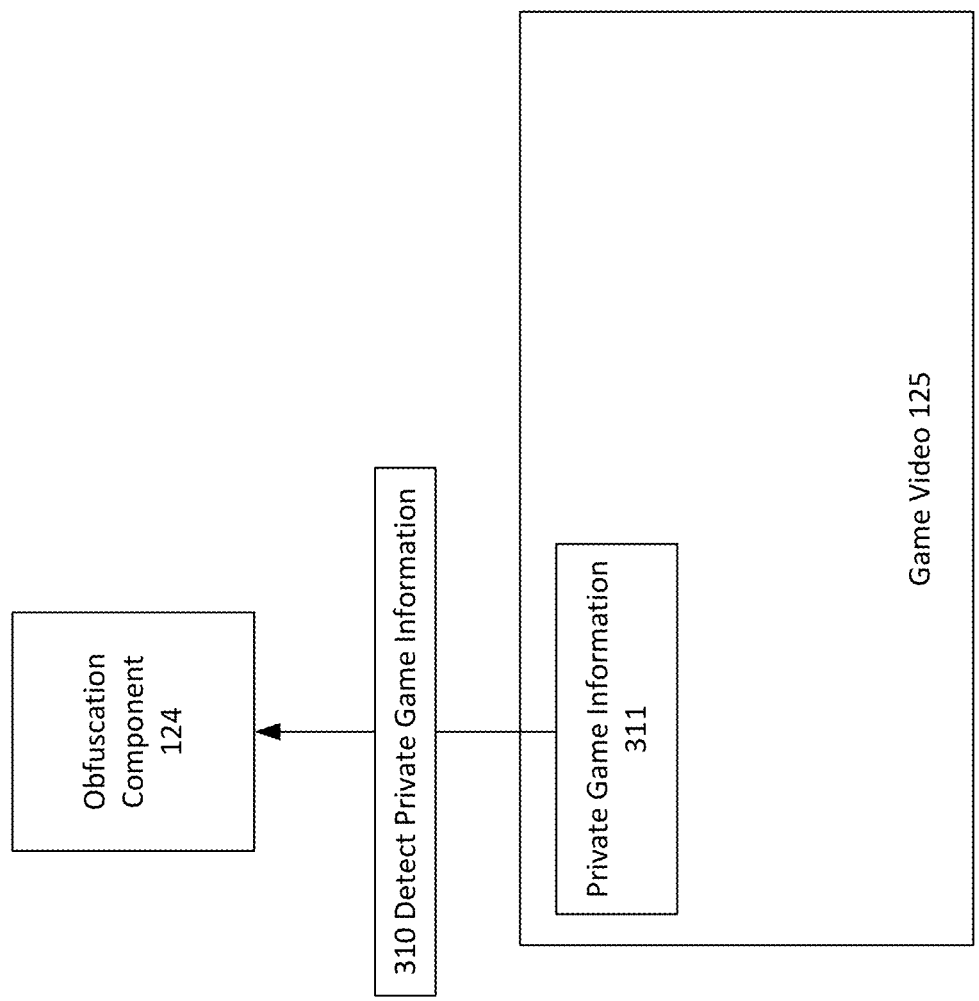
FIG. 3 is a diagram illustrating example detection of private game information that may be used in accordance with the present disclosure.

Referring now to FIG. 3, an example is shown in which, at action 310, the obfuscation component 124 detects private game information 311 within the game video 125. As set forth above, the private game information 311 may include, for example, an indication of a server that the streamer is playing on, an indication of how much health the streamer has, an indication of the streamer's virtual location in the game world, an indication of the streamer's inventory, and the like. In some examples, private game information 311 may be displayed using text, graphics (e.g., maps, charts, graphs, etc.), or combinations thereof. Obfuscation component 124 may detect the private game information 311 using any of the example techniques described above, such as with reference to FIG. 2, or other information detection techniques.

Figure 4:
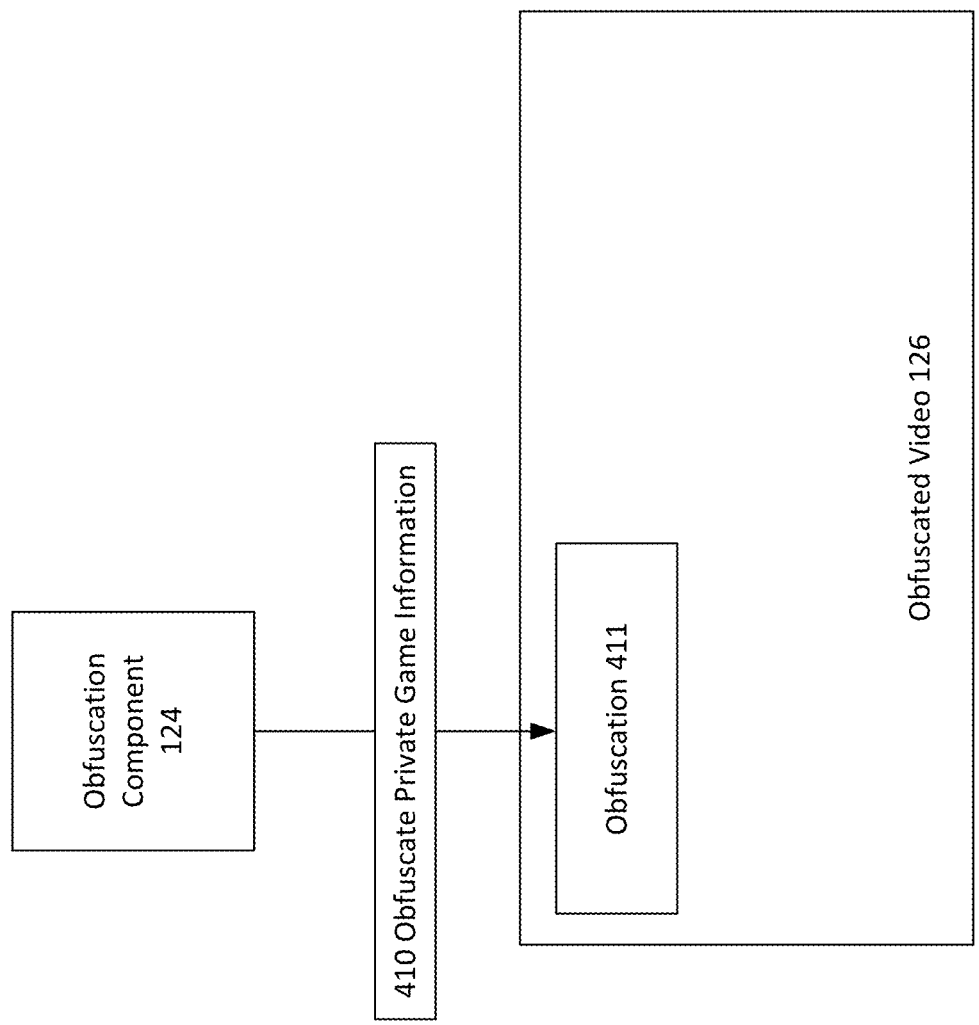
FIG. 4 is a diagram illustrating example obfuscation of private game information that may be used in accordance with the present disclosure.

Referring now to FIG. 4, an example is shown in which, at action 410, the obfuscation component 124 obfuscates the private game information 311 (shown previously in FIG. 3) using an obfuscation 411 to result in obfuscated video 126. In some examples, obfuscation 411 may include an image and/or graphics that are inserted into the game video 125 by the obfuscation component 124. In some examples, the obfuscation 411 may overlay and/or replace the private game information within the obfuscated video 126. In other examples, the obfuscation 411 may be a blurring or obscuring of the private game information 311, such as via one or more image filtering processes, for example such that the private game information 311 is no longer comprehendible to viewers 140A-C. It is noted that there is no requirement that the obfuscation 411 must occupy the exact same image area as the private game information. For example, in some cases, the obfuscation 411 may only obfuscate part of the private game information 311. In other cases, the obfuscation 411 may obfuscate additional areas of the captured video that do not include the private game information 311.

In some examples, the obfuscation component 124 may be configured to detect and/or obfuscate private game information 311 without requiring the streamer to visually detect and manually indicate the location of the private game information 311. For example, the obfuscation component 124 may detect the private game information 311 using non-visual detection techniques, such as the computer-based image recognition techniques and video game metadata techniques described above. Moreover, the obfuscation component 124 may be configured to obfuscate private game information 311 on behalf of the streamer without requiring the streamer to manually generate an overlay or otherwise manually obfuscate the private game information 311. As the locations and display of private game information 311 may often vary between different games and/or between different events in the same game, this may save considerable time and effort on behalf of the streamer. Although the obfuscation component 124 may not require the streamer to manually identify or obfuscate the private game information 311, the obfuscation component 124 may nevertheless allow the streamer to set certain options, such as options to designate various types of information (e.g., location information, health information, server information, inventory information, etc.) as information to be obfuscated or not obfuscated, certain time ranges at which to obfuscate or not obfuscate information, and the like.

Figure 5:
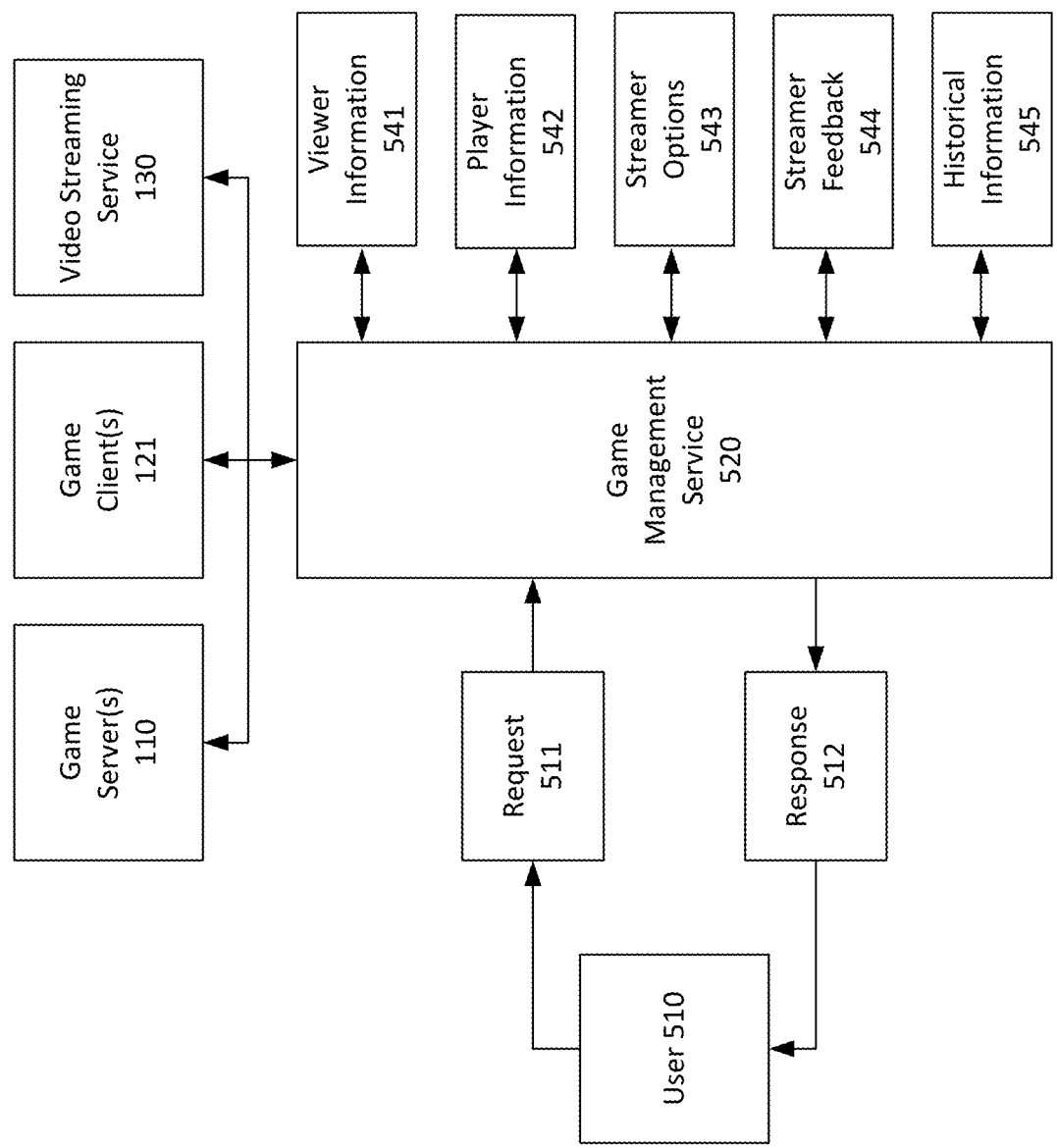
FIG. 5 is a diagram illustrating an example service-based stream sniping prevention system that may be used in accordance with the present disclosure.

In addition to the techniques described above, stream sniping may also be prevented using various service-based measures. Referring now to FIG. 5, some example service-based stream prevention techniques will now be described in detail. In particular, in the example of FIG. 5, a user 510 may issue a game-related request 511, such as a request to join a video game, to join a particular server within the video game, to move to a particular location within the video game, to participate in a particular match within the video game, to join a particular team within the video game, to assume control of a particular character within the video game, to acquire a particular resource within the video game, and the like. The request may be provided to a game management service 520, such as a matchmaking service, which may issue a response 512 to the request, such as accepting or denying the request or blocking various options from the user 510, based on various data, for example including viewer information 541, player information 542, streamer options 543, streamer feedback 544, and historical information 545. As shown in FIG. 5, the game management service 520 may communicate with various components, for example one or more gamer servers 110, one or more game clients 121, and video streaming service 130, such as to receive and update the above-described and other data.

Viewer information 541 may include information about viewers of video game streams, such as viewers 140A-C of FIGS. 1 and 2. In some examples, viewer information may be compiled and maintained based on information provided by video streaming service 130 of FIGS. 1 and 2. In some examples, viewer information 541 may include a listing of viewers that are currently viewing streams from a particular video game. For example, in some cases, request 511 may be a request for user 510 to join a particular video game. In some examples, game management service may consult viewer information 541 to determine whether user 510 is currently viewing a stream from that video game. If so, then, in some examples, the request 511 may be denied (e.g., by way of an error message, transparently disallowing the user 510 from joining the game, etc.), for example permanently or at least until the user 510 ceases to receive the identified stream. If, on the other hand, user 510 is not currently viewing a stream from that video game, then, in some examples, the request 511 may be allowed, and the user may be permitted to join the game. By blocking viewers of a streamer's video from joining the same game as the streamer, those viewers may be prevented from obtaining and using the streamer's private game information against the streamer. These and other specific examples are described in greater detail below with reference to FIGS. 6 and 7.

Player information 542 may include information about various video game players, including streamer players. For example, in some cases, player information 542 may include information about game servers on which particular streamers are currently playing, teams on which particular streamers are currently playing, matches in which streamers are currently participating, characters which streamers are currently controlling, current streamer locations in a virtual game world, current streamer game inventories, and the like. This information may also be used to accept or deny request 511 from user 510. For example, consider a scenario in which user 510 is currently receiving a stream from a Streamer AAA, and user 510 issues a request 511 to join a particular game server. In some examples, game management service 520 may consult player information 542 to determine whether or not Streamer AAA is currently playing on the same game server that user 510 has requested to join. If so, then, in some examples, the request 511 may be denied. If not, then, in some examples, the request 511 may be accepted, and the user 510 may be permitted to join the requested game server. As another example, consider a scenario in which user 510 is currently receiving a stream from a Streamer AAA, and user 510 issues a request 511 to participate a particular game match. In some examples, game management service 520 may consult player information 542 to determine whether or not Streamer AAA is currently participating in the same match that user 510 has requested to join. If so, then, in some examples, the request 511 may be denied. If not, then, in some examples, the request 511 may be accepted, and the user 510 may be permitted to participate in the requested match. In some examples, stream viewers may also be prohibited from performing other game actions, such as moving to the same location as (or within a particular distance of) the streamer, joining a team that competes with the streamer, assuming control of a character that competes with the streamer, acquiring certain resources, and the like.

Streamer options 543 may include certain options that may be set by a streamer for allowing (or not allowing) various game requests from viewers. For example, a particular streamer may set an option to allow viewers of her stream to join the same game that she is playing but not to join the same game server or to participate in the same match in which she is currently playing. As another example, a streamer may allow viewers of her stream to join the same game that she is playing but not to join a competing team or to move within a specified distance of her within the virtual game world.

Streamer feedback 544 may include feedback from streamers regarding particular user requests 511. For example, in some cases, game management service 520 may provide a message or an alert to a streamer indicating that one of the streamer's viewers is requesting to perform a particular game action (e.g., to join the same game, server, and/or match as the streamer, to join a competing team, to control a competing character, etc.). In some cases, this alert may be provided in-game to the streamer, via various in-game graphical, audio, tactile, and/or other alert mechanisms. In some examples, the streamer may then be prompted to provide streamer feedback 544, such as instructions to accept or deny the viewer's request.

Historical information 545 may include historical data regarding streamers and stream viewers. For example, historical information 545 may be leveraged to determine whether a user 510 is attempting to join a game with a streamer that the user has watched frequently in the past. If so, then the user 510 may be prohibited from joining. Historical information 545 may also be used to determine other types of information indicative of stream sniping, such as whether user 510 has a history of getting kills against streamer players in a particular game. Other metadata, such as how many viewers a streamer has, may also be used to determine whether viewers of a stream should be allowed to join a game or perform other game actions. Additionally, retrospective actions may be taken, such as by detecting stream sniping behavior after the fact (e.g. running a weekly set of reports) and discouraging future stream sniping behavior via mechanisms such as banning players that are determined to have engaged in stream sniping, sending warnings, having a three-strike policy, etc.

Figure 6:
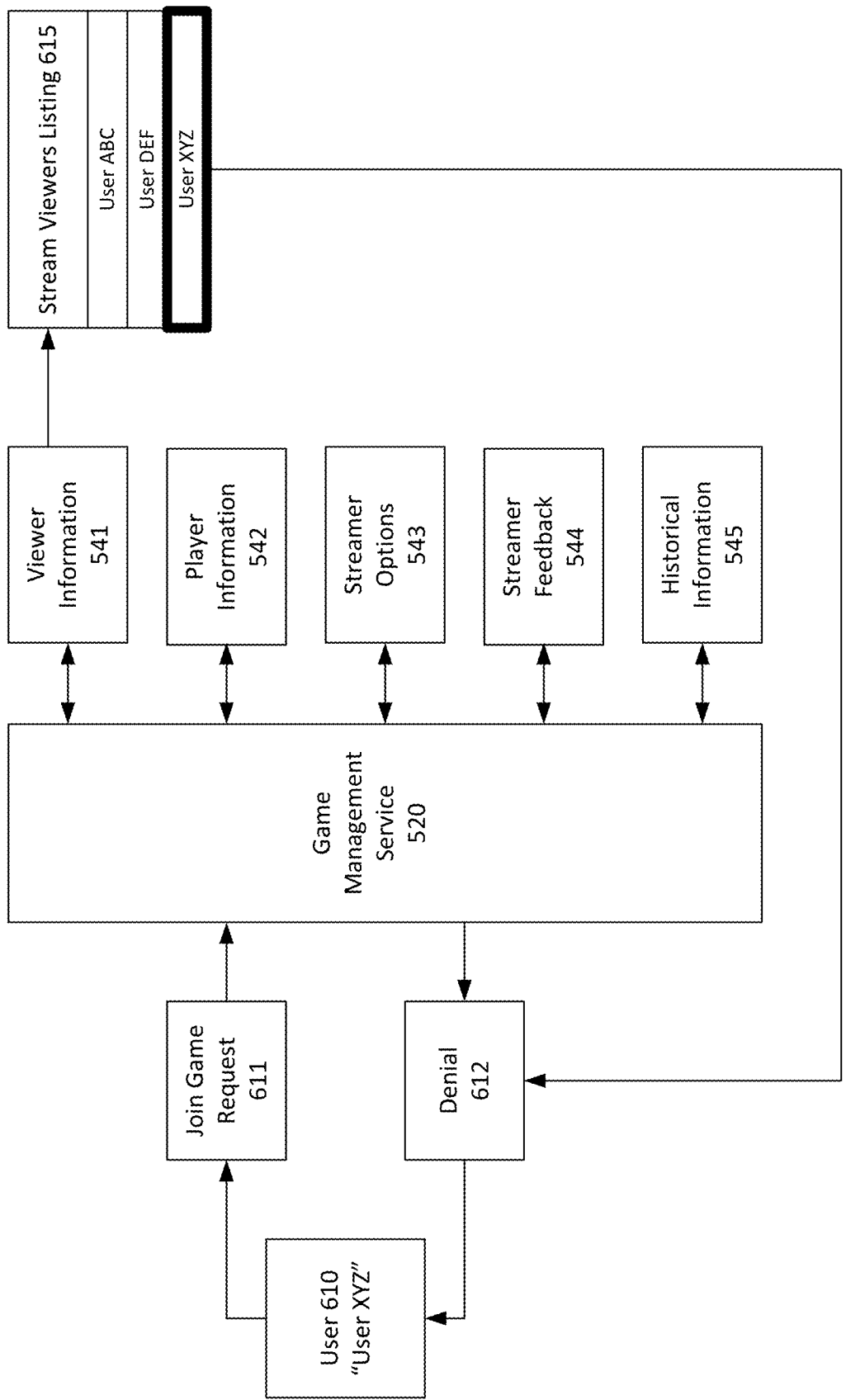
FIG. 6 is a diagram illustrating an example denial of a join game request that may be used in accordance with the present disclosure.

Some specific examples of denial and acceptance of various user requests will now be described in detail with reference to FIGS. 6 and 7. In particular, in the example of FIG. 6, a user 610 may issue a join game request 611 to join a particular video game. As shown in FIG. 6, user 610 has a username User_XYZ. In combination with the join game request 611, user 610 may provide his username (User_XYZ) and a corresponding password to game management service 520, such as to confirm the identity of user 610. In the example, of FIG. 6, upon receiving the join game request 611 from User 610, game management service 520 may consult viewer information 541 to determine whether user 610 is currently receiving a stream of the same video game that the user 610 is attempting to join. As shown, viewer information 541 may include a stream viewers listing 615, which identifies the usernames of users that are currently viewing streams of the video game that the user 610 is attempting to join. In this example, stream viewers listing 615 includes an entry identifying the username User_XYZ, which is the username of user 610, thereby indicating that user 610 is currently receiving a stream of the same video game that the user 610 is attempting to join. Based on this information, game management service 520 may issue a denial 612 of the join game request 611. As set forth above, the denial 612 may include, for example, an error message or transparently disallowing the user 610 from joining the game. Also, in some examples, the denial 612 may be permanent or may only be temporary, such as at least until the user 610 ceases to receive the identified stream.

In the example of FIG. 6, the user's password (User_XYZ) is used for the join game request 611 and is also used for viewing of the video game stream. It is noted, however, that a particular user may often have multiple associated usernames or other identification information. For example, in some cases, the same user may have a first username that is used for viewing of video streams (e.g., a username associated with the video streaming service 130) and a second username associated with joining and playing of video games (e.g., a username associated with the game management service 520). In some examples, game management service 520 may communicate with video streaming service 130 and possibly other components or services, such as to identify and link multiple usernames (or other identification information) associated with the same user.

Moreover, while the example of FIG. 6 employs a username as identification information for user 610, other types of identification information may also be employed. For example, in some cases, viewer information 541 may include secondary identifying information for various stream viewers, such their Internet Protocol (IP) addresses, Media Access Control (MAC) addresses, or other computing addresses of the stream viewers. The game management service 520 may then attempt to match or correlate the Internet Protocol (IP) address, Media Access Control (MAC) address, or other computing address of the user 610 with computing addresses of current stream viewers identified in the viewer information 541. This may provide an additional layer of security to defend against malicious users that attempt to perform stream sniping by acquiring and using multiple usernames, accounts, or other identities.

Figure 7:
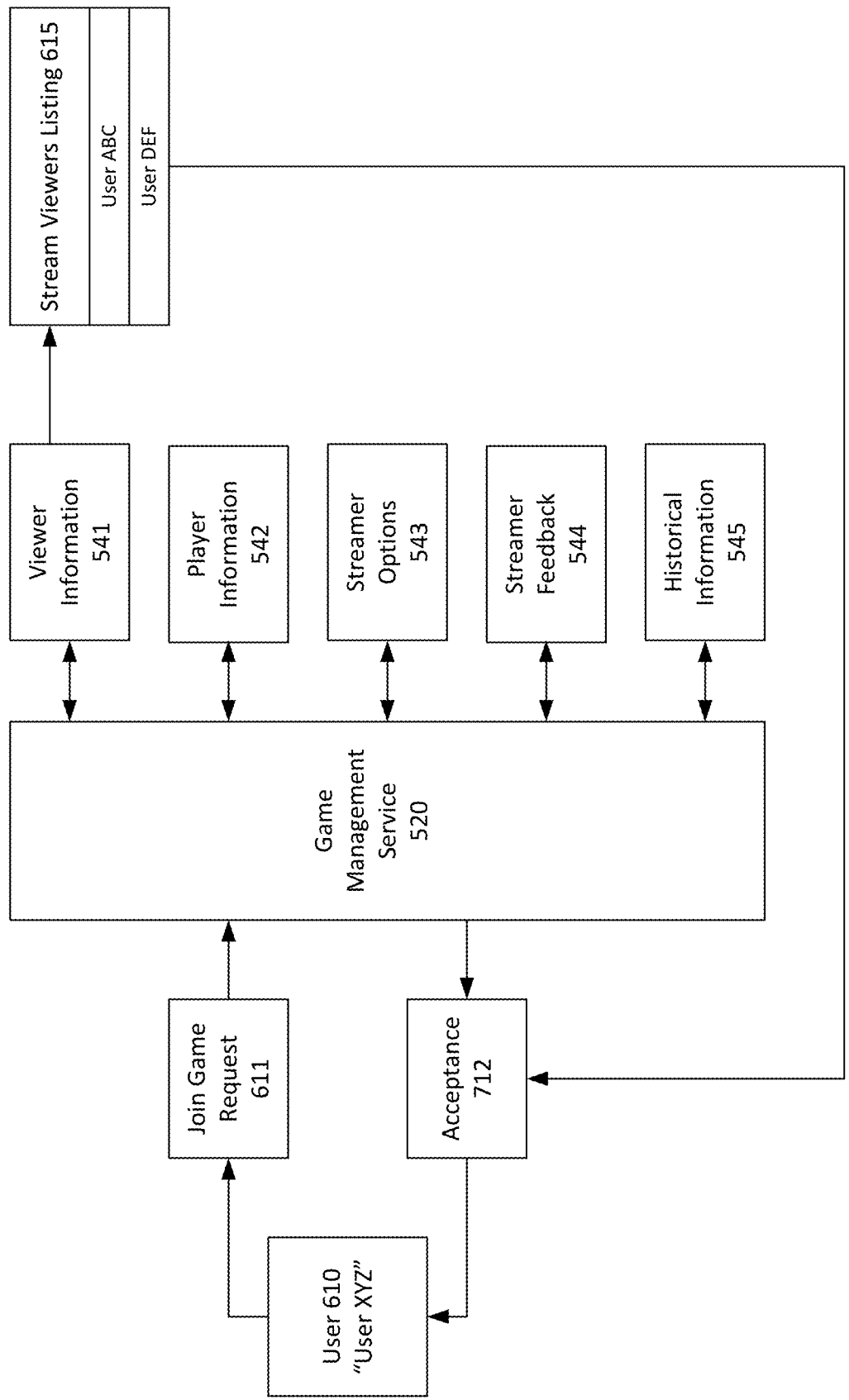
FIG. 7 is a diagram illustrating an example acceptance of a join game request that may be used in accordance with the present disclosure.

In the example of FIG. 7, the user 610 also issues a join game request 611 to join a particular video game. In the example of FIG. 7, upon receiving the join game request 611 from User 610, game management service 520 may again consult viewer information 541 to determine whether user 610 is currently receiving a stream of the same video game that the user 610 is attempting to join. However, in the example of FIG. 7, stream viewers listing 615 does not include an entry identifying the username User_XYZ, which is the username of user 610. This indicates that, in this example, user 610 is not currently receiving a stream of the same video game that the user 610 is attempting to join. Based on this information, game management service 520 may issue an acceptance 712 of the join game request 611.

It is noted that the above-described examples relate to preventing viewers of a streamed game from performing certain actions within that game (e.g., joining the game as players, joining a particular server within the game, etc.). It is noted, however, that the techniques described herein may also be used from the opposite perspective, for example to prevent existing game players from requesting to view a stream provided by a streamer that is playing in the same game. For example, in some cases, when a user requests to view a stream of a particular video game, the user may provide identification information that may be compared to identification information of current players of the same video game (e.g., such as may be stored in player information 542). If the user's identification information is matched or linked to a current player's identification information, then the user may be denied from viewing the requested stream. Additionally, the request to view the stream may also be accepted or denied based on various other factors, such as whether the requestor is on the same server as the streamer, is in the same match, is on a competing team, and the like.

Figure 8:
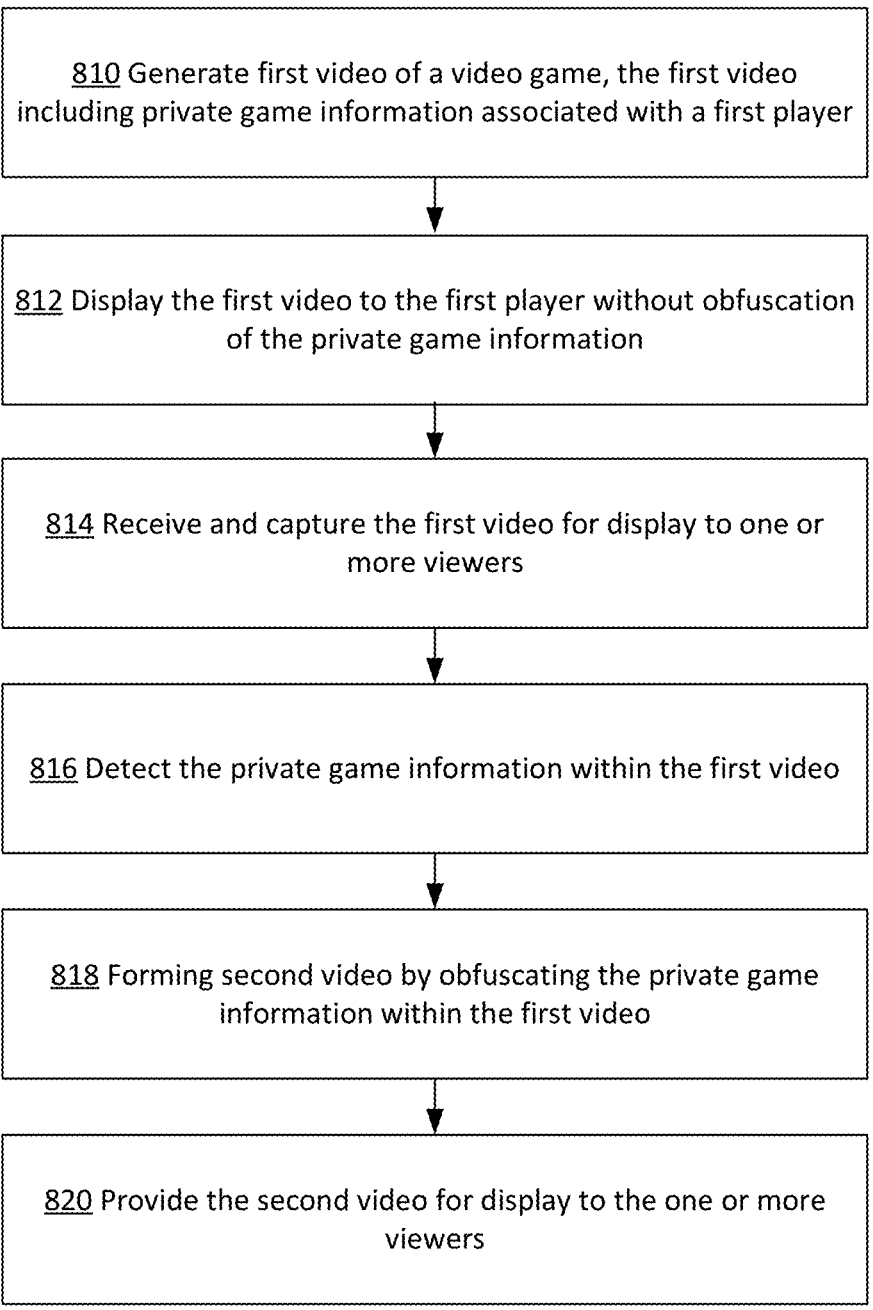
FIG. 8 is a flowchart illustrating an example client-based stream sniping deterrence process that may be used in accordance with the present disclosure.

FIG. 8 is a flowchart illustrating an example client-based stream sniping deterrence process that may be used in accordance with the present disclosure. As shown, the process of FIG. 8 begins at operation 810, at which first video of a video game is generated. For example, the first video generated at operation 810 may be game video 125 of FIGS. 1-3. In some examples, the first video may be generated by a game server and/or game client, with the assistance of one or more graphics rendering components, such as based on user input from various game players. As set forth above, the first video may be generated by the video game for display to a first player. The first video may include graphical depictions of video game scenes, such as including virtual characters and/or virtual objects controlled by the first player within a virtual game world. The first video also includes private game information associated with the first player. In particular, the private game information may include information about the first player that the video game provides to the first player but does not provide to all other players. For example, the video game may not provide the private game information to one or more other players that compete with the first player. The private game information may include, for example, an indication of a server that the first player is playing on, an indication of how much health the first player has, an indication of the first player's virtual location in the game world, an indication of the first player's inventory, and the like.

At operation 812, the first video is displayed to the first player without obfuscation of the private game information. For example, as shown in FIGS. 1 and 2, the first video (e.g., game video 125) is displayed to the first player via display 122 of player device 120. As set forth above, displaying the first video to the first player without obfuscation of the private game information may allow the first player to use the private game information to his or her advantage within the video game.

At operation 814, the first video is received and captured for display to one or more viewers other than the first player. For example, as set forth above, the first player may be a streamer that provides captured game video for streaming to one or more other viewers. Accordingly, the first video (e.g., game video 125) may be received by a video capture component 123 (e.g., screen capture software) and an obfuscation component 124. In some examples, the video capture component 123 may capture the first video and provide the captured first video to the obfuscation component 124. As set forth above, in some examples, the obfuscation component 124 may be a plug-in component associated with screen capture software. Also, in some examples, a video game title associated with the video game may be determined, and the plug-in component may be selected from a plurality of available plug-in components based, at least in part, on the video game title.

At operation 816, the private game information may be detected within the first video, for example by the obfuscation component 124. In some examples, detection of the private game information may include locating the private game information within the first video. As set forth above, in some examples, the private game information may be detected and/or located based, at least in part, on non-visual detection of the private game information. In some examples, the non-visual detection may include use of a computer-based image recognition process, receipt of metadata from the video game (e.g., from video game server and/or client components, and/or other types of non-visual detection. In some examples, detecting and/or locating of the private game information may include determining a screen type (e.g., title screen, matchmaking screen, in-match screen, menu screen, cinematic sequence, etc.) that is currently being displayed in the first video.

In some examples, the obfuscation component may execute one or more computer-based image recognition processes on the captured video, such as to identify features of the captured video that may be likely to include private game information. For example, in some cases, areas of the captured video that include text may be considered as likely to include private game information, and the obfuscation component may perform an image recognition process to identify text within the captured video. Additionally, in some examples, image recognition may be employed to identify a type of screen that is currently being displayed in the video, and private game information may then be detected based on the type of screen that is currently being displayed.

Also, in some examples, the detecting and/or locating of the private game information may be performed based on metadata received from the video game. In some cases, the metadata may be updated in real-time and/or periodically throughout gameplay, such as to provide the obfuscation component with information about what is currently being displayed in the first video. In some examples, the metadata may include an indication of a type of screen that is currently being displayed in the first video. Also, in some examples, the metadata may include indications of game events that occur within the game, such as starting or ending of a match, display of a map, movement to certain locations, acquisition of resources, display of inventories, and other game events, and private game information may then be detected based on occurrence of these events. Furthermore, in some examples, the metadata may identify and/or indicate image coordinates at which the private game information is located.

At operation 818, second video (e.g., obfuscated video 126) is formed by obfuscating the private game information within the first video. For example, as shown in FIGS. 1 and 2, the obfuscation component 124 may obfuscate private game information within game video 125 to form obfuscated video 126. The private game information may be obfuscated by, for example, overlaying or replacing the private game information with other image or graphical content, by blurring or obscuring the private game information, or using any other suitable techniques. In some examples, the second video (e.g., obfuscated video 126) may be identical to the first video (e.g., game video 125) with the exception that private game information is obfuscated in the second video but is viewable (e.g., not obfuscated) in the first video. Thus, in some examples, the second video may include the first video with the private game information obfuscated. Accordingly, in some examples, portions of the first video that do not include private game information may be included and viewable in the second video. At operation 820, the second video (e.g., the first video with the private information obfuscated) is provided for display to one or more viewers other than the first player. For example, as shown in FIGS. 1 and 2, the obfuscation component 124 may provide the obfuscated video 126 for transmission to video streaming service 130, which may, in turn, transmit the obfuscated video 126 to viewers 140A-C. By obfuscating the private game information in the obfuscated video 126, the obfuscation component 124 may prevent the viewers 140A-C from seeing or otherwise obtaining the private game information. Thus, viewers 140A-C will not be able to use the private game information in the video game to the detriment of the streamer, thereby deterring stream sniping.

Figure 9:
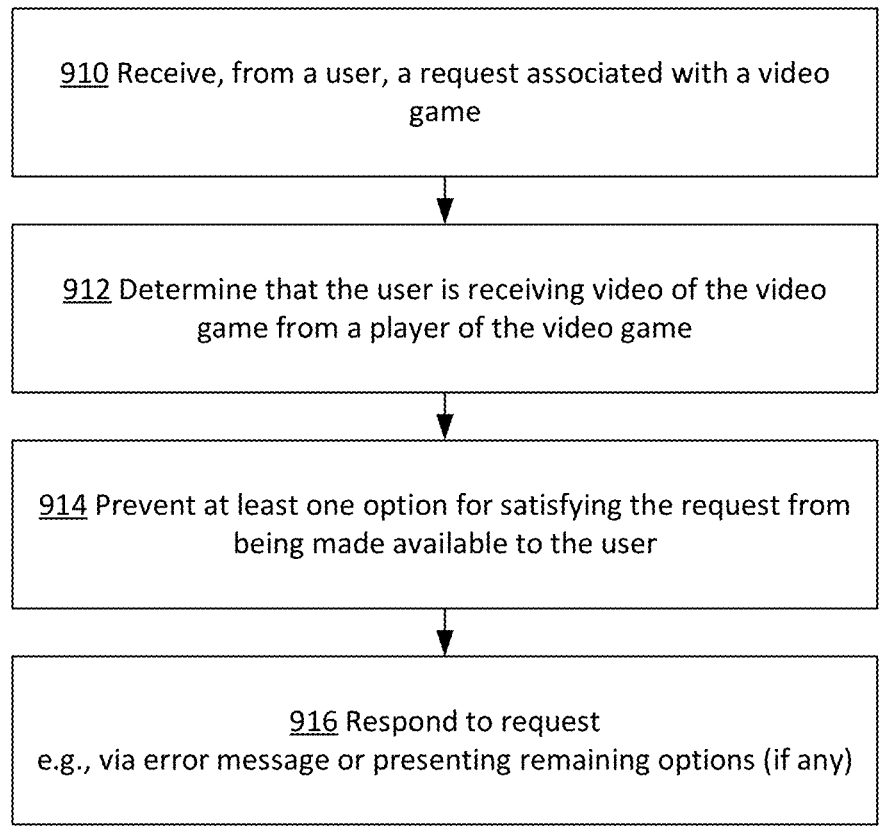
FIG. 9 is a flowchart illustrating an example service-based stream sniping deterrence process that may be used in accordance with the present disclosure.

FIG. 9 is a flowchart illustrating an example service-based stream sniping deterrence process that may be used in accordance with the present disclosure. As shown, the process of FIG. 9 begins at operation 910, at which a request associated with a video game is received from a user. As set forth above, the request may include, for example, a request to join the video game, to join a video game server, to take control of a character, to join a team, to participate in a match, to move to a virtual location, to acquire a resource, or another request associated with the video game.

At operation 912, it is determined that the user is receiving (e.g., currently receiving) video of the video game from a player of the video game. For example, the player may be a streamer that captures and provides video of his or her playing of the video game to other viewers. As set forth above, in some examples, the determination of operation 912 may be made by matching or otherwise relating first identification information associated with the user to second identification information associated with a viewer of the video of the video game. In some examples, the first and/or second identification information may include at least one of a username or a computing address (e.g., Internet Protocol (IP) address, Media Access Control (MAC) address, etc.). For example, in some cases, identification information for viewers of video game streams may be collected, stored and updated, such as in viewer information 541 of FIGS. 5-7. A matchmaking or other game management service 520 may then compare identification information provided by (or otherwise associated with) the requesting user to the stream viewer identification information to determine whether any of the compared identification information matches or otherwise relates, such as by identifying one or more matching (or linked) user names, matching or related computing addresses, and the like.

At operation 914, at least one option for satisfying the request may be prevented from being made available to the user. For example, in some cases, if the user is requesting to join a game, game server, and/or game match, then the user may be prevented from joining the same game, game server, and/or game match in which the streamer is currently participating. In some examples, although the user may be prevented from joining the same game, game server, and/or game match as the streamer, the user may still be provided with options to join other games, game servers, and/or game matches that may still match or otherwise relate to the user's request. For example, the user may request to join a game, game server, and/or game match having certain characteristics, such as a particular competition type (e.g., combat, sports, car racing, etc.), a particular number of players, a particular virtual location, and the like. In some examples, although the user may be prevented from joining the same game, game server, and/or game match as the streamer, the user may still be provided with options to join other games, game servers, and/or game matches that may still match or otherwise relate to the characteristics in the user's request. Also, in some examples, in addition to the individual streamer, the user may also be prevented from joining the same game, game server, and/or game match in which any of the streamer's teammates participate.

In some examples, game management service 520 may provide the streamer with an indication (e.g., via in-game alert, email, text, etc.) of the request from the user. The game management service 520 may then receive from the streamer an instruction to prevent the at least one option for satisfying the request from being made available to the user. For example, in some cases, the streamer may provide an instruction to prevent the user from joining the same game, game server, or game match in which the streamer is participating. In other examples, the streamer may allow the user to participate, for example provided that certain conditions are met (e.g., the user is not a competing team or controlling a competing character, etc.).

In some cases, operation 914 may include generating an error message, such as stating that the user is being blocked from the streamer's game, game server, and/or game match because the user is currently viewing a stream being provided by the streamer. In some examples, the error message may request that the user terminate receipt of the stream and/or may indicate that the user may be permitted to join the streamer's game, game server, and/or game match upon termination of the receipt of the stream. In some cases, the game management service 520 may determine that the user has ceased to receive the video of the video game and may then subsequently allow the at least one option to be made available to the user. In other examples, operation 914 may include blocking the user from joining the streamer's game, game server, and/or game match in a manner that is transparent to the user, such as by omitting the streamer's game, game server, and/or game match from a list of results that are returned to the user in response to the request. For example, although the user may be blocked from joining the streamer's game, game server, and/or game match, the user may be provided with options to join other games, game servers, and/or game matches that match the user's request (provided that any other such options exist).

In some examples, the at least one option that is prevented from being made available to the user may include at least one option that relates to the user competing against the player that is streaming video to the user. For example, in some cases, the at least one prevented option may include joining a same game server as the player, joining a team that competes against the player, participating in a match against the player, or moving within a particular distance of the player. In some examples, the user may be permitted to perform various actions, as long as those actions do not result in the user competing against the streamer. For example, in some cases, the user may be permitted to join the same game, game server, and/or game match as the streamer as long the user is not on a team and/or controlling a character that competes with the streamer. As another example, the user may be permitted to join the same game, game server, and/or game match as the streamer as long the user's character does not move within a particular threshold distance of the streamer's character within the virtual game world.

In yet other examples, operation 914 may include preventing the at least one option from being made available to the user based, at least in part, on historical information regarding behavior of the user. For example, historical information may be leveraged to determine whether the user is attempting to join a game with a streamer that the user has watched frequently in the past. If so, then the user may be prohibited from joining. Historical information may also be used to determine other types of information indicative of stream sniping, such as whether the user has a history of getting kills against streamer players in a particular game.

At operation 916, the request from the user may be responded to. For example, as described above, the user may be provided with an error message, such as stating that the user is being blocked from the streamer's game, game server, and/or game match. In other examples, although the user may be blocked from joining the streamer's game, game server, and/or game match, the user may be provided with options to join other games, game servers, and/or game matches that match the user's request (if any).

Figure 10:
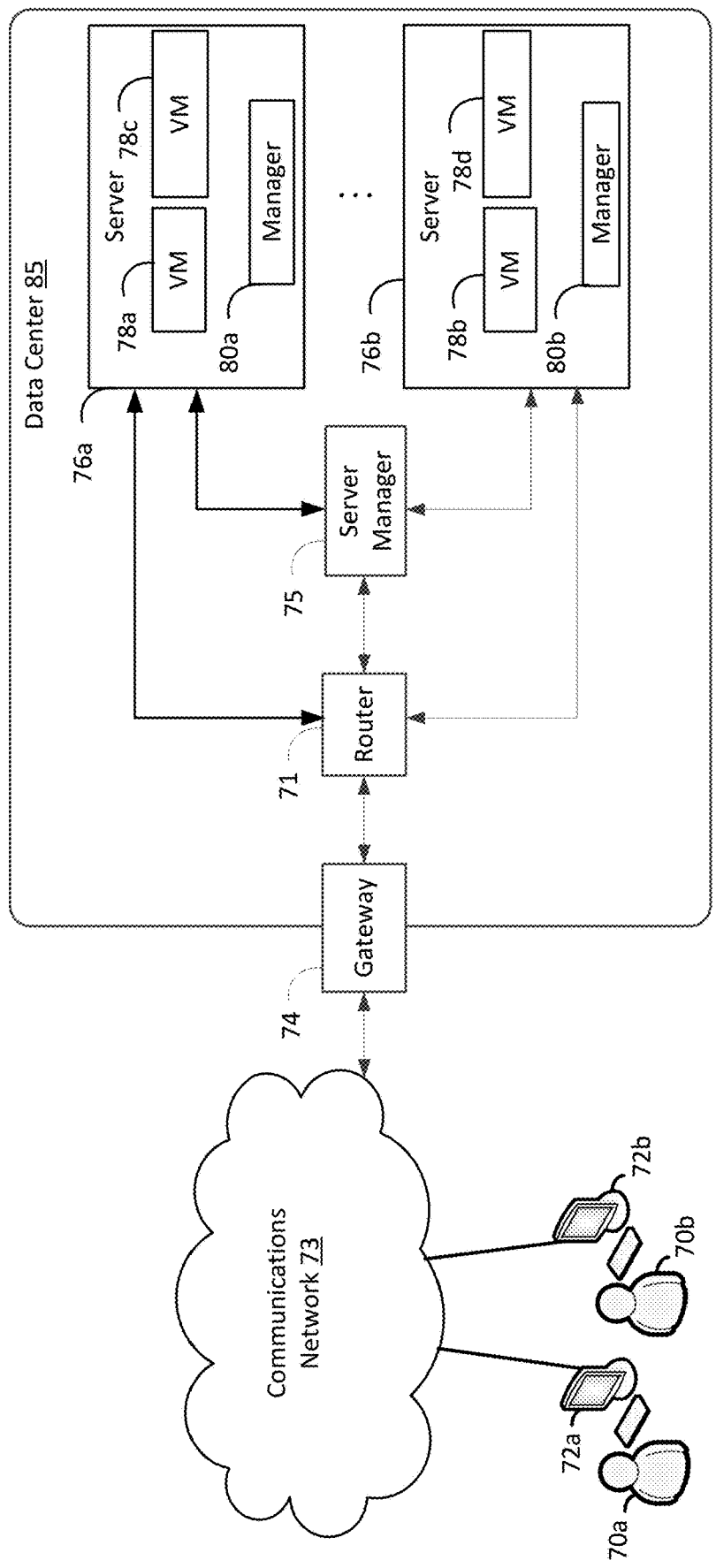
FIG. 10 is a diagram illustrating an example system for transmitting and providing data that may be used in accordance with the present disclosure.

An example system for transmitting and providing data will now be described in detail. In particular, FIG. 10 illustrates an example computing environment in which the embodiments described herein may be implemented. FIG. 10 is a diagram schematically illustrating an example of a data center 85 that can provide computing resources to users 70*a* and 70*b* (which may be referred herein singularly as user 70 or in the plural as users 70) via user computers 72*a* and 72*b* (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-d (which may be referred herein singularly as virtual machine instance 78 or in the plural as virtual machine instances 78).

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 10, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 10 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 10, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 10, a server manager 75 is also employed to at least in part direct various communications to, from and/or between servers 76a and 76b. While FIG. 10 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 10 has been greatly simplified and that many more networks and networking devices may be utilized to interconnect the various computing systems disclosed herein. These network topologies and devices should be apparent to those skilled in the art.

It should also be appreciated that data center 85 described in FIG. 10 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 11:
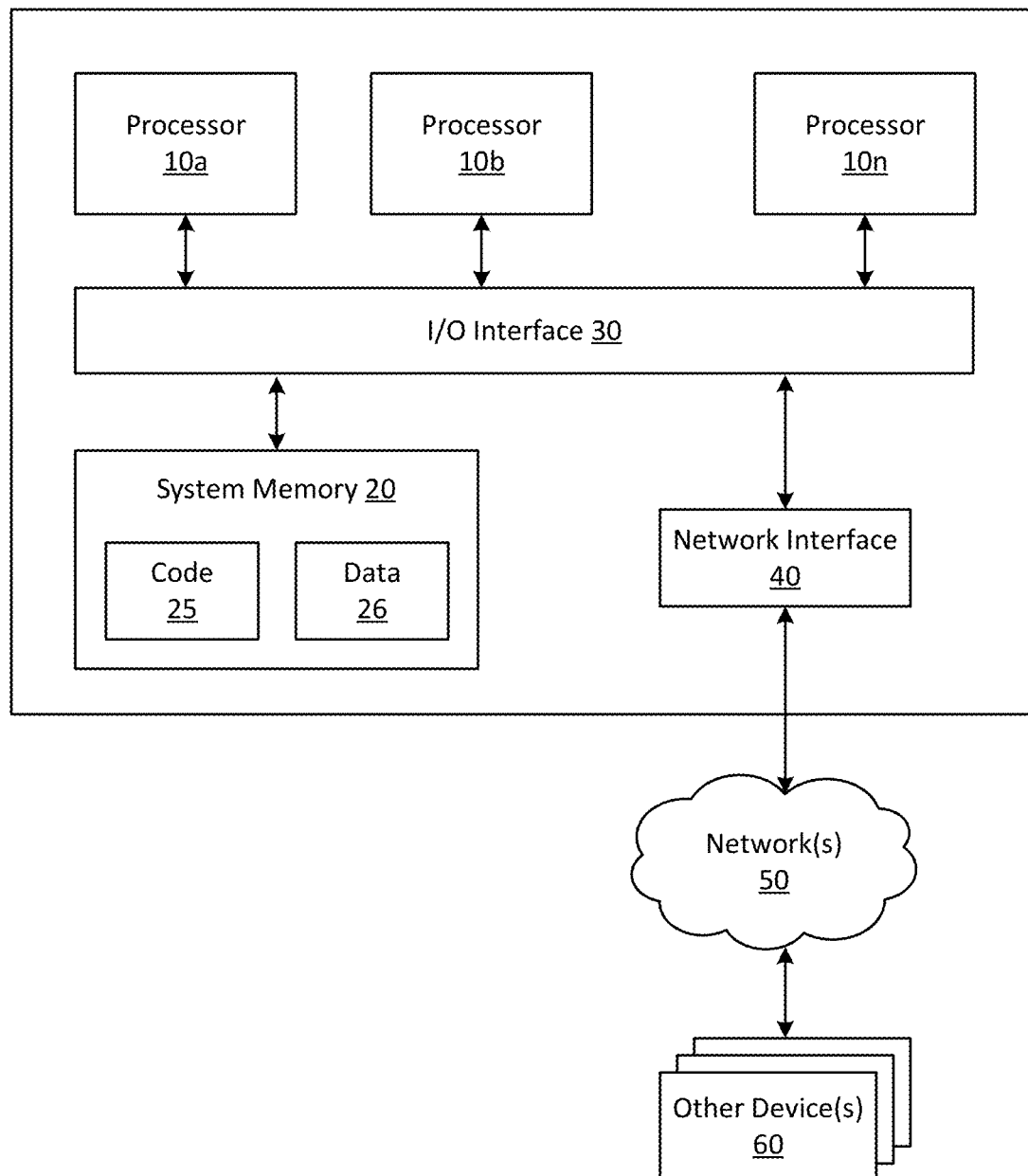
FIG. 11 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 11 depicts a computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system for deterrence of stream sniping comprising:
   one or more processors; and
   one or more memories having stored therein instructions that, upon execution by the one or more processors, cause the computing system perform operations comprising:
      receiving, from a user, a request to join a video game;
      determining that the user is receiving video of the video game;
      preventing, based on the user receiving the video of the video game, the user from joining the video game while the user is receiving the video of the video game;
      determining that the user has ceased to receive the video of the video game; and
      allowing, based on the user ceasing to receive the video of the video game, the user to join the video game.

2. The computing system of claim 1, wherein the determining that the user is receiving video of the video game comprises relating first identification information associated with the user to second identification information associated with a viewer of the video of the video game.

3. The computing system of claim 2, wherein at least one of the first identification information or the second identification information comprises a computing address.

4. The computing system of claim 1, wherein the operations further comprise:
   providing, to a player of the video game, an indication of the request; and
   receiving, from the player, an instruction to prevent the user from joining the video game.

5. A computer-implemented method for deterrence of stream sniping comprising:
   receiving, from a user, a request to join a video game;
   determining that the user is receiving video of the video game;
   preventing, based on the user receiving the video of the video game, the user from joining the video game while the user is receiving the video of the video game;
   determining that the user has ceased to receive the video of the video game; and
   allowing, based on the user ceasing to receive the video of the video game, the user to join the video game.

6. The computer-implemented method of claim 5, wherein the determining that the user is receiving video of the video game comprises relating first identification information associated with the user to second identification information associated with a viewer of the video of the video game.

7. The computer-implemented method of claim 6, wherein at least one of the first identification information or the second identification information comprises a computing address.

8. The computer-implemented method of claim 5, further comprising:
   providing, to a player of the video game, an indication of the request; and
   receiving, from the player, an instruction to prevent the user from joining the video game.

9. One or more non-transitory computer-readable storage media having stored thereon instructions that, upon execution by a computing device, cause the computing device to perform operations comprising:

receiving, from a user, a request to join a video game;

determining that the user is receiving video of the video game;

preventing, based on the user receiving the video of the video game, the user from joining the video game while the user is receiving the video of the video game;

determining that the user has ceased to receive the video of the video game; and allowing, based on the user ceasing to receive the video of the video game, the user to join the video game.

10. The one or more non-transitory computer-readable storage media of claim 9, wherein the determining that the user is receiving video of the video game comprises relating first identification information associated with the user to second identification information associated with a viewer of the video of the video game.

11. The one or more non-transitory computer-readable storage media of claim 10, wherein at least one of the first identification information or the second identification information comprises a computing address.

12. The one or more non-transitory computer-readable storage media of claim 9, wherein the operations further comprise:

providing, to a player of the video game, an indication of the request; and receiving, from the player, an instruction to prevent the user from joining the video game.

* * * * *